(12) United States Patent
Oo

(10) Patent No.: US 8,989,735 B1
(45) Date of Patent: Mar. 24, 2015

(54) APPARATUS AND METHOD FOR ENABLING ROAMING RADIOS TO OPERATE IN DIFFERENT SYSTEMS DURING AN INCIDENT EVENT

(71) Applicant: Motorola Solutions, Inc., Schaumburg, IL (US)

(72) Inventor: Myo Tun Oo, Elgin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1 day.

(21) Appl. No.: 14/085,163

(22) Filed: Nov. 20, 2013

(51) Int. Cl.
H04W 4/00 (2009.01)
H04W 8/02 (2009.01)
H04W 4/08 (2009.01)
H04W 4/22 (2009.01)

(52) U.S. Cl.
CPC ...... *H04W 8/02* (2013.01); *H04W 4/08* (2013.01); *H04W 4/22* (2013.01)
USPC ........ 455/432.1; 455/518; 455/519; 455/520; 455/521; 455/507; 455/509

(58) Field of Classification Search
USPC .................. 455/518, 519, 507, 509, 432.1
See application file for complete search history.

(56) References Cited

U.S. PATENT DOCUMENTS

| | | | |
|---|---|---|---|
| 5,613,209 A | 3/1997 | Peterson et al. | |
| 6,204,844 B1 | 3/2001 | Fumarolo et al. | |
| 6,477,387 B1 | 11/2002 | Jackson et al. | |
| 7,643,840 B2 | 1/2010 | Shim | |
| 7,970,426 B2 | 6/2011 | Poe et al. | |
| 8,098,639 B2 * | 1/2012 | McDonald et al. | 370/338 |
| 8,155,619 B2 | 4/2012 | Shaffer et al. | |
| 8,260,338 B2 | 9/2012 | Shaffer et al. | |
| 8,781,515 B2 * | 7/2014 | Agulnik et al. | 455/518 |
| 8,855,698 B2 * | 10/2014 | Gonsalves et al. | 455/519 |
| 2003/0100326 A1 | 5/2003 | Grube et al. | |
| 2005/0037794 A1 | 2/2005 | Namm et al. | |
| 2007/0060144 A1 | 3/2007 | Mills et al. | |
| 2010/0159976 A1 * | 6/2010 | Marocchi et al. | 455/519 |
| 2010/0177661 A1 * | 7/2010 | Dailey | 370/254 |
| 2012/0115494 A1 | 5/2012 | Christensen et al. | |
| 2012/0172083 A1 | 7/2012 | Logalbo et al. | |
| 2013/0142056 A1 | 6/2013 | Abplanalp et al. | |

FOREIGN PATENT DOCUMENTS

| | | |
|---|---|---|
| EP | 1330138 A2 | 7/2003 |
| GB | 2406468 A | 3/2005 |

* cited by examiner

*Primary Examiner* — Khalid Shaheed
(74) *Attorney, Agent, or Firm* — Daniel R. Bestor

(57) ABSTRACT

A controller in a network assigns a dedicated foreign radio talk group to each radio frequency (RF) site in the network for use by foreign radios during an incident event. The controller receives a registration request from a foreign radio and registers the foreign radio in a first RF site. The controller receives a talk group affiliation request from the foreign radio and, responsive to determining that the first RF site is in the incident event mode, affiliates the foreign radio with dedicated foreign radio talk group that is assigned to the first RF site, associated with at least one of a system identifier, a Wide Area Communication Network identifier and a talk group identifier provided by the foreign radio, and/or associated with the talk group identifier provided by the foreign radio and included in a master list including talk group IDs associated with a function.

20 Claims, 9 Drawing Sheets

APPARATUS AND METHOD FOR ENABLING ROAMING RADIOS TO OPERATE IN DIFFERENT SYSTEMS DURING AN INCIDENT EVENT

BACKGROUND OF THE INVENTION

During an incident event in a region, first responders from different regions may be deployed to the region where the incident event occurred. The deployed first responders are typically deployed with the radios used in their home regions. Radios used in different regions may operate on different systems that may or may not have Inter Subsystem Interface (ISSI) connectivity. As such, the radio used by a deployed first responder may not be operable on a system used in the region where the incident event occurred, unless the system where the incident event occurred has ISSI connectivity with the radio's home system or the radio is specifically provisioned with a local radio ID in order for the radio to operate on the system where the incident event occurred. When there is a need for radios to roam from a first system to a second system and when the systems do not have an ISSI connection, in order for the roaming radios to communicate with the second system, each of the roaming radios must be provided with a unique local radio ID by the second system and must be programmed with the second system information. However, providing each of the roaming radios with a local radio ID from the second system may not be possible, timely, or efficient.

Accordingly, there is a need for an improved apparatus and method for enabling roaming radios to operate in different systems during an incident event.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
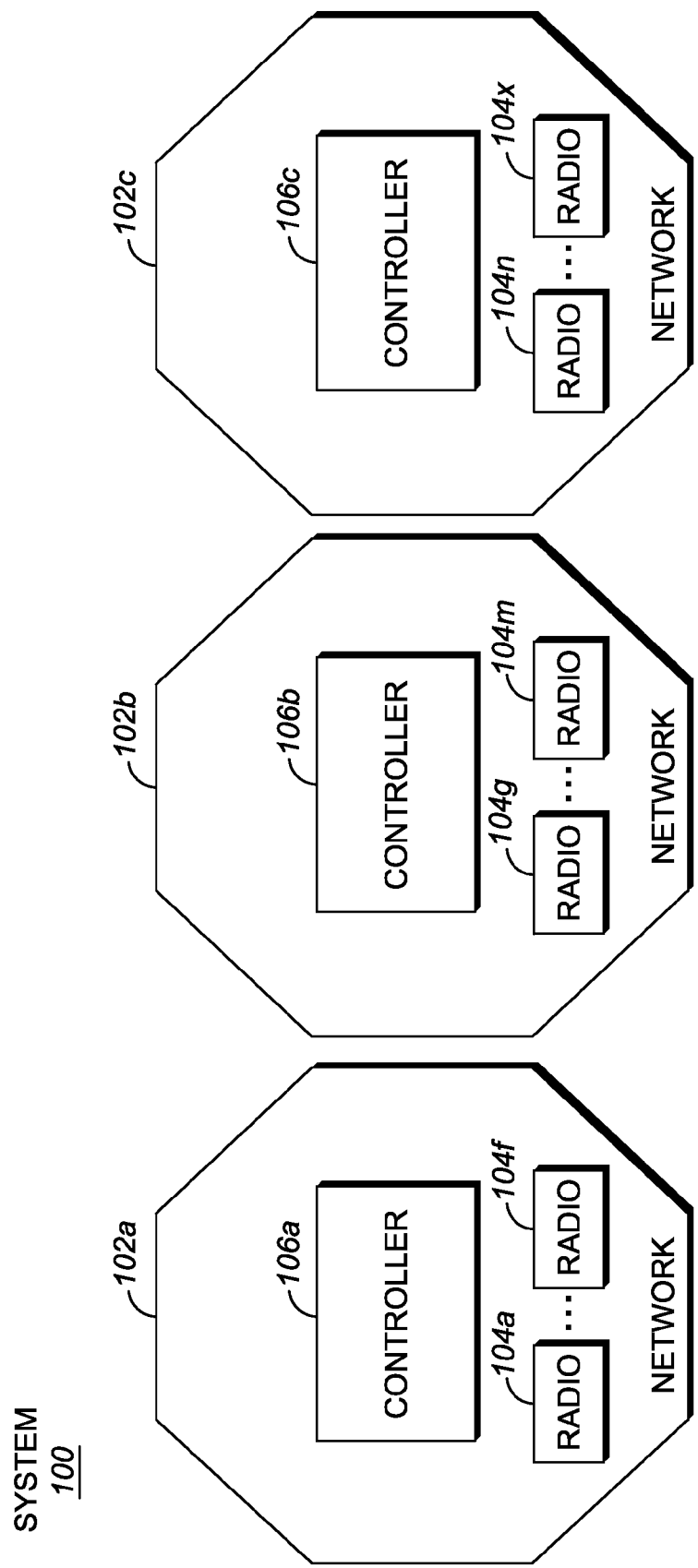
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods where a controller in a network assigns at least one dedicated foreign radio talk group to each radio frequency (RF) site in the network for use by foreign radios during an incident event. The controller receives a registration request from a foreign radio and registers the foreign radio in a first RF site upon determining that the first RF site is in the incident event mode. The controller receives a talk group affiliation request from the foreign radio and affiliates the foreign radio with dedicated foreign radio talk group that is assigned to the first RF site, associated with at least one of a system identifier, a Wide Area Communication Network (WACN) identifier and a talk group identifier provided by the foreign radio, and/or associated with the talk group identifier provided by the foreign radio and included in a master list including talk group IDs associated with a function.

FIG. 1 is a block diagram of a system used in accordance with some embodiments. System 100 includes multiple networks 102 (for example, networks 102a, 102b and 102c), each of which operates separately from the other networks, e.g., such that there is no Inter Subsystem Interface (ISSI) connectivity between networks 102a-102c. Each network 102 may include one or more radio frequency (RF) sites and includes a controller 106 (for example, controllers 106a, 106b and 106c) configured to enable an incident event mode configuration in RF sites in an associated network 102. Controller 106 may selectively enable an incident event mode configuration in one or more RF sites when an incident event occurs. Each of networks 102a-102c may be configured to operate in accordance with any standard or digital voice communication protocol, including, but not limited to, Project 25 (P25), Terrestrial Trunk Radio (TETRA), Digital Mobile Radio (DMR), and other Land Mobile Radio (LMR) radio network technologies.

Networks 102 may include a plurality of portable communication devices, mobile communication devices, and fixed communication devices. Non-limiting examples of the communications devices (collectively referred to herein as radios 104 (i.e., radios 104a-104x)) used in networks 102 include portable two-way radios or mobile radios. Each radio 104 may register its permanent IP address in one of networks 102a, 102b and 102c, wherein a network with which a radio registers its permanent IP address is referred to as a home network and a network with which the radio registers a temporary IP address or care-of address when the radio is roaming is referred to as a foreign network. A radio roaming to a foreign network is referred to as a foreign radio and radios registered with a home network are referred to as local radios. In FIG. 1, network 102a is the home network of radios 104a-104f, network 102b is the home network of radios 104g-104m, and network 102 is the home network of radios 104n-104x.

Controllers 106 in each of networks 102a-102c may dynamically assign foreign radios to dedicated foreign radio talk groups set up in networks 102a-102c so as to enable roaming radios 104 responding to incident events in a foreign network to operate in networks 102a-102c even when there is no ISSI connectivity between networks 102a-102c and when the roaming radios 104 are not individually provisioned with local radio IDs from those foreign networks. Controllers 106 may be pre-configured with a set of Working Unit IDs (WUIDs) and a set of Working Group IDs (WGIDs). Each WGID may be associated with a dedicated foreign radio talk group prior to activation of the incident event mode. Alternatively, the WUIDs and WGIDs may be dynamically assigned when the incident event mode is activated.

Subsequent to creating the set of WUIDs and the set of WGIDs, the controller 106 in each network 102 may provision the dedicated foreign radio talk groups to local console dispatchers. Thereafter, when an incident event occurs in one or more of networks 102a-102c and the incident event mode configuration is enabled in the network where the event occurred, the WUIDs and WGIDs may be assigned to roaming foreign radios registering with the network. Subsequent to assigning the WUIDs and WGIDs to the foreign radios, console operators in a network 102 where the incident event mode is enabled may dispatch/monitor the dedicated foreign radio talk groups and may connect the dedicated foreign radio talk groups with talk groups used by local radios.

Radios 104 roaming into a foreign network where the incident event mode is enabled may temporarily operate in the foreign network based on basic information provided by the roaming radios to the foreign network. For example, if radios 104a-104d and radios 104i-104l temporarily roam from networks 102a and 102b, respectively, to foreign network 102c, when radios 104a-104d and 104i-104l are turned on in network 102c, each of radios 104a-104d and 104i-104l may register with network 102c using the radio's system ID and Wide Area Communication Network (WACN) ID. When the incident event mode is enabled in network 102c, controller 106c assigns WUIDs to foreign radios 104a-104d and 104i-104l registering in network 102c. Subsequent to registering with network 102c and receiving a WUID from network 102c, each of foreign radios 104a-104d and 104i-104l sends a talk group affiliation request in order to join a talk group in network 102c. Controller 106c sends a WGID to each of foreign radios 104a-104d and 104i-104l so that the roaming foreign radios can be affiliated with a dedicated foreign radio talk group.

In an embodiment, each controller 106 affiliates all foreign radios in an RF site in networks 102a-102c with the same dedicated foreign radio talk group, regardless of the talk group requested in the affiliation request sent by the foreign radio. For example, controller 106c may allocate a first dedicated foreign radio talk group for incident event mode in a first RF site in network 102c, a second dedicated foreign radio talk group for incident event mode in a second RF site in network 102c, and a third dedicated foreign radio talk group for incident event mode in a third RF site in network 102c. Thereafter, when the incident event mode is enabled in network 102c, every foreign radio registering in the first RF site will be affiliated with the first foreign radio talk group, every foreign radio registering in the second RF site will be affiliated with the second foreign radio talk group, and every foreign radio registering in the third RF site will be affiliated with the third foreign radio talk group. Hence, without reprograming foreign radios or pre-provisioning the foreign radios with dedicated local radio IDs, foreign radios in an RF site will be able to quickly and easily communicate with other foreign radios in the RF site when the incident event mode is enabled. Because all foreign radios are affiliated with the same talk group at an RF site, controller 106 may assign one RF channel at each site for the dedicated foreign radio talk group assigned to foreign radios and the remaining channels at that site may be available for local traffic.

If, for example, radio 104a roams to network 102c and initially registers with the first RF site in network 102c, when radio 104a roams from the first RF site to the second RF site in network 102c, controller 106c may disable repeating of talk group audio for radio 104a on the first foreign radio talk group and send a re-registration command to radio 104a to instruct radio 104a to register with the second RF site. Subsequent to radio 104a registering with the second RF site, radio 104a may be affiliated with the second foreign radio talk group, which is assigned as the dedicated foreign radio talk group in the second RF site during an incident event in the second RF site.

Controllers 106 may selectively enable the incident event mode in one or more RF sites. For example, rather than enabling incident event mode configuration in all RF sites in network 102c, controller 106c may enable the incident event mode configuration in specific RF sites and less than all RF sites. Accordingly, if an incident is limited to the first RF site, controller 106c may enable the incident event mode in only the first RF site and not in the second and third RF sites. In such as case, controller 106c may allow temporary registrations of foreign radios from systems without ISSI connectivity and without provisioned local radio ID in the first RF site and deny those registration requests in the second and third RF sites.

Controllers 106 may also affiliate foreign radios to dedicated foreign radio talk groups based on the system ID and/or WACN ID provided by a foreign radio during registration. For example, when the incident event mode is enabled in the first RF site in network 102c, all foreign radios from network 102a operating in the first RF site may be affiliated with a dedicated foreign radio talk group set up in one or more RF sites in the network 102c for radios from network 102a. Therefore, in addition to or instead of being affiliated with the dedicated foreign radio talk group for the first RF site, radios from network 102a may additionally or alternatively be affiliated with the dedicated foreign radio talk group set up for foreign radios from network 102a.

Further, controllers 106 may affiliate foreign radios to dedicated foreign radio talk groups based upon the functional unit to which the radio operator belongs. For example, fire fighters may be affiliated with one dedicated foreign radio talk group, police may be affiliated with another dedicated foreign radio talk group, etc. To enable similar functional units from different systems to be grouped, the controller 106 may use a pre-programmed list (also referred to as a master list) that includes information about various independent systems/networks and the talk group IDs assigned to various functional units in each system. The list may also be used to prevent foreign radios that are not affiliated with a specific functional unit from joining the dedicated foreign radio talk group associated with the functional unit. In an embodiment, controllers 106 may affiliate foreign radios to the dedicated foreign radio talk group set up in one or more RF sites in the system and assigned to a functional unit based on the system ID, WACN ID, and/or talk group ID provided by the foreign radios. If the talk group ID provided by a foreign radio is not in the master list, the controller may reject the foreign radio functional unit affiliation request.

Further, roaming foreign radios could stay in their selected talk group or be assigned unique temporary working IDs for use on the control channel. This allows some group separation if multiple radios from different talk groups roam to the same RF site. Consider, for example, that there is a forest fire in an area covered by network 102c. In response to the forest fire, firefighters from network 102a and first responders from network 102a are deployed to the area in network 102c. The firefighters may attempt to affiliate with a dedicated foreign radio talk group assigned to firefighters by providing, for example, system ID 1, WACN ID 2 and talk group ID 3 (i.e., the talk group ID for firefighters). In response to the request from the firefighters and based on information obtained from the master list, the controller 106c assigns WGID 1 associated with dedicated foreign radios for firefighters. Alternatively, controller 106c may assign the firefighters to a local talk group assigned to local firefighters. The first responders may also attempt to affiliate with a dedicated foreign radio talk group assigned to first responders by providing, for example, system ID 1, WACN ID 2 and talk group ID 4 (i.e., the talk group ID for first responders). In response to the request from the first responders and based on information obtained from the master list, the controller 106c assigns WGID 2 associated with dedicated foreign radios for first responders. Alternatively, controller 106c may assign the first responders to a local talk group assigned to local first responders.

Controllers 106 may assign limited capabilities and/or a lower priority to the WGID assigned to dedicated foreign radios talk groups. For example, no emergency calls may be allowed in one or more dedicated foreign radios talk groups. Additionally or alternatively, a local talk group call in an emergency mode may preempt the calls of dedicated foreign radios talk groups.

When the incident event mode is turned off, controllers 106 may remove the talk group call privilege for the foreign radios, for example, by disabling repeating of talk group audio, and force the foreign radios to re-register with the network. At this point, registration attempts from foreign radios will be denied, if there is no ISSI connectivity between the networks or if the foreign radio is not provisioned with a local radio ID.

In some embodiments, a set of existing working unit IDs and a set of working talk group IDs that are provisioned to enable interoperability with other systems that have ISSI connectivity may be reused as the WUIDs and WGIDs. In these embodiments, the controllers may not be pre-configured with a set of WUID and WGID. The controller may create the WUID and WGID by borrowing from a local ID space or an ISSI ID space.

Figure 2:
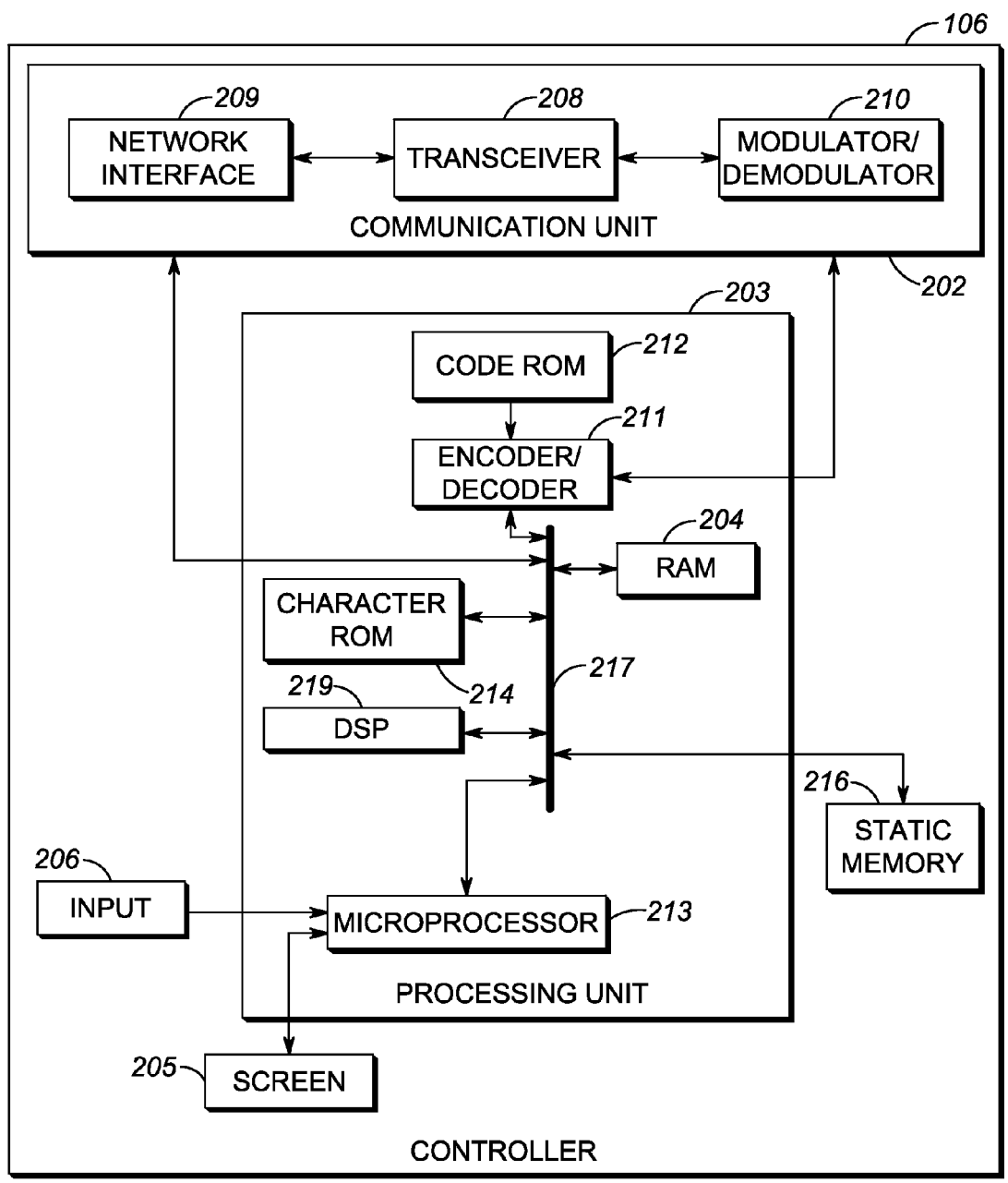
FIG. 2 is a block diagram of a controller used in accordance with some embodiments.

FIG. 2 is a block diagram of a controller 106 used in accordance with some embodiments. The controller 106 includes a communications unit 202 coupled to a common data and address bus 217 of a processing unit 203. The controller 112 may also include an input unit (e.g., keypad, pointing device, etc.) 206 and a display screen 205, each coupled to be in communication with the processing unit 203.

The processing unit 203 may include an encoder/decoder 211 with an associated code ROM 212 for storing data for encoding and decoding voice, data, control, or other signals that may be transmitted or received by the controller. The processing unit 203 may further include a microprocessor 213 coupled, by the common data and address bus 217, to the encoder/decoder 211, a character ROM 214, a RAM 204, and a static memory 216.

The communications unit 202 may include a network interface 209 configurable to communicate with network components (for example, the eNBs), and other user equipment (for example, subscriber units) within its communication range. The communications unit 202 may include one or more broadband and/or narrowband transceivers 208, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Additionally or alternatively, the communications unit 202 may include one or more local area network or personal area network transceivers such as Wi-Fi transceiver perhaps operating in accordance with an IEEE 802.11 standard (e.g., 802.11a, 802.11b, 802.11g), or a Bluetooth transceiver. Additionally or alternatively, the communications unit 202 may additionally or alternatively include one or more wire-lined transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wire-lined network.

The transceivers may be coupled to a combined modulator/demodulator 210 that is coupled to the encoder/decoder 211. The character ROM 214 stores code for decoding or encoding data such as control, request, or instruction messages, channel change messages, and/or data or voice messages that may be transmitted or received by the controller. Static memory 216 may store operating code associated with processing foreign radio resource requests in accordance with this disclosure, including one or more of the steps set forth in FIGS. 3-4E.

Figure 3A:
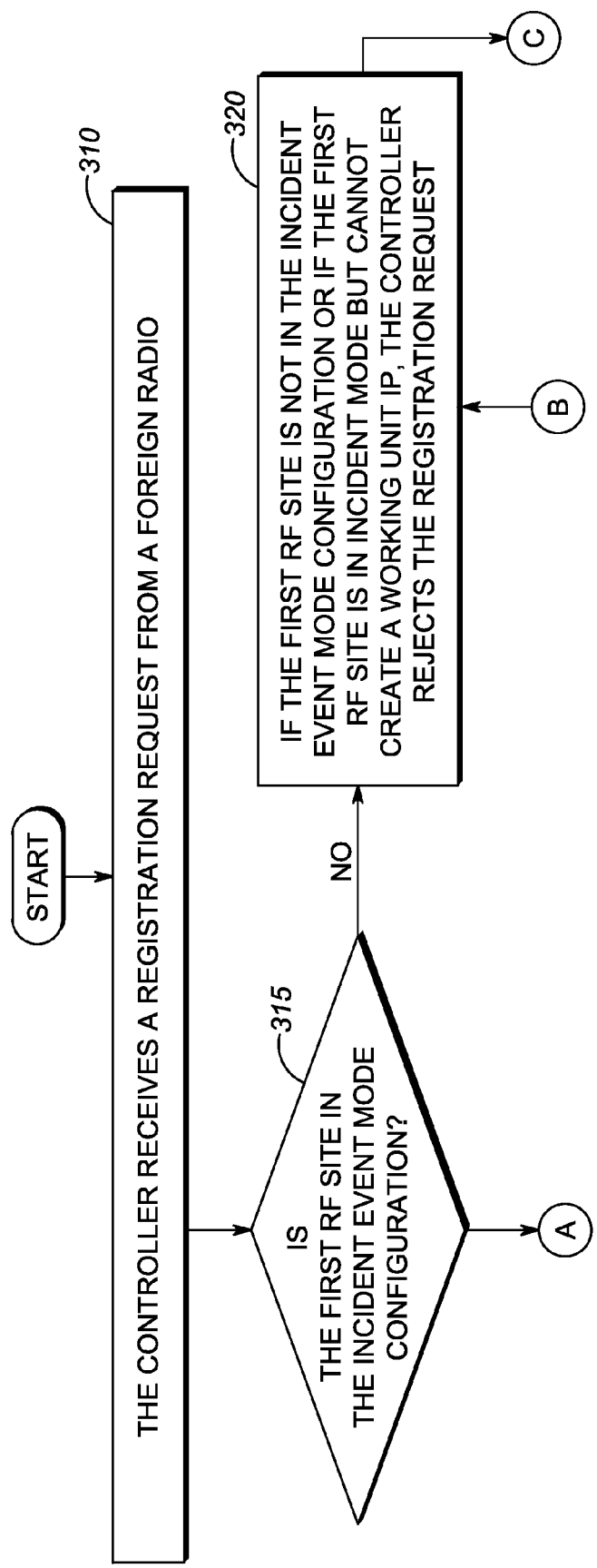
FIGS. 3A-3B set forth a flow diagram of how a foreign radio sends a unit registration request when an incident event mode is enabled in a network in accordance with some embodiments FIGS. 4A-4E include flow diagrams of how a group affiliation request from a foreign radio is processed when the controller is operating in incident event mode in accordance with some embodiments.
Figure 3B:
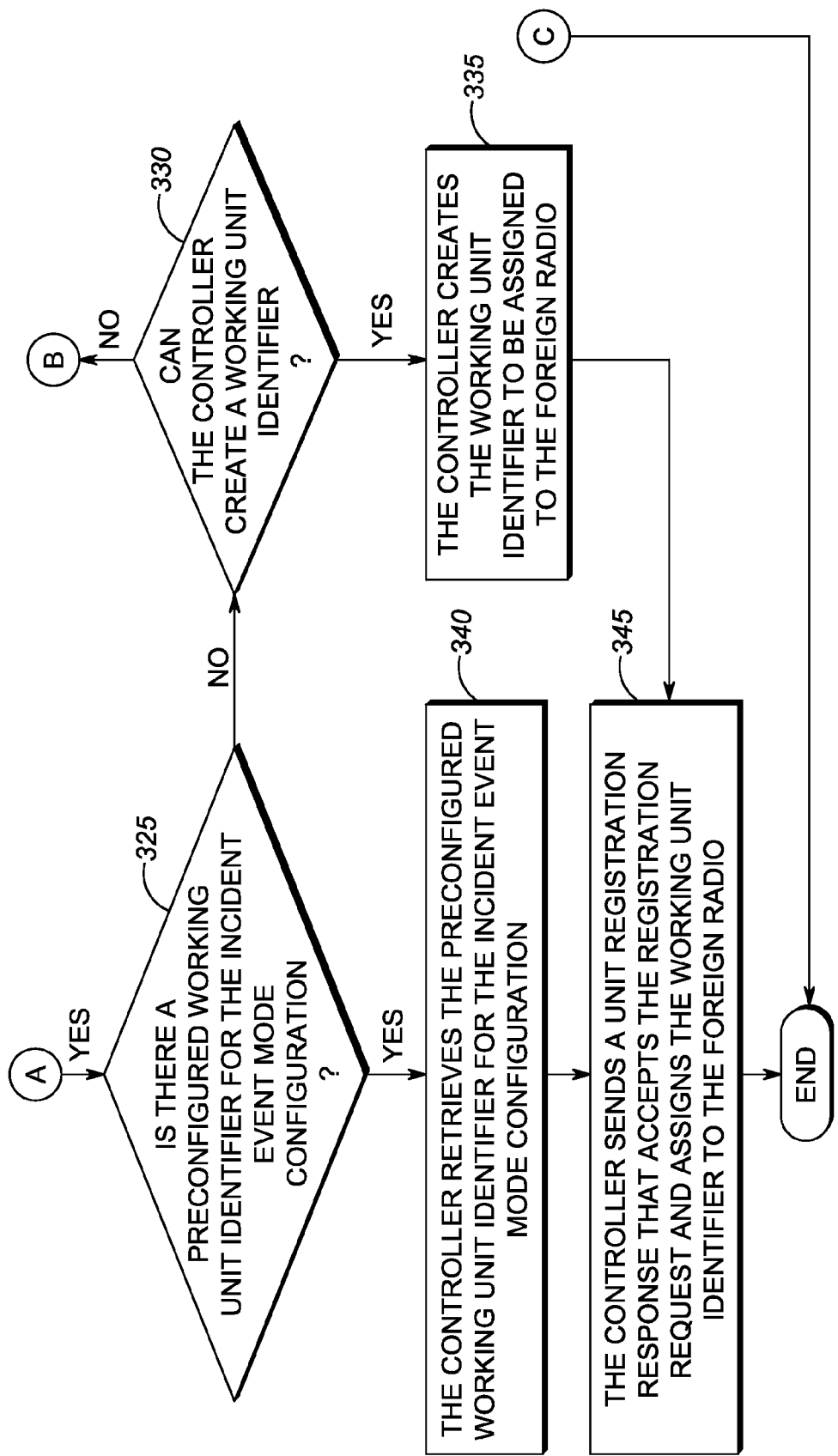

FIGS. 3A-3B set forth a flow diagram of how a foreign radio sends a unit registration request and how a controller responds when an incident event mode is enabled in a network in accordance with some embodiments. At 310, the controller receives a registration request from a foreign radio in a first RF site. At 315, the controller determines if the first RF site is in an incident event mode configuration. At 320, if the first RF site is not in the incident event mode configuration, the controller rejects the registration request. At 325, the controller determines whether there is a preconfigured working unit identifier for the incident event mode configuration. At 330, if there is no preconfigured working unit identifier for the incident event mode configuration, the controller determines whether it can create the working unit identifier to be assigned to the foreign radio. If the controller cannot create the working unit identifier to be assigned to the foreign radio, the controller rejects the registration request. At 335, if the controller can create the working unit identifier to be assigned to the foreign radio, the controller creates the working unit identifier to be assigned to the foreign radio. At 340, if there is a preconfigured working unit identifier for the incident event mode configuration, the controller retrieves the preconfigured working unit identifier for the incident event mode configuration. At 345, the controller sends a unit registration response that accepts the registration request and assigns the working unit identifier to the foreign radio.

Figure 4A:
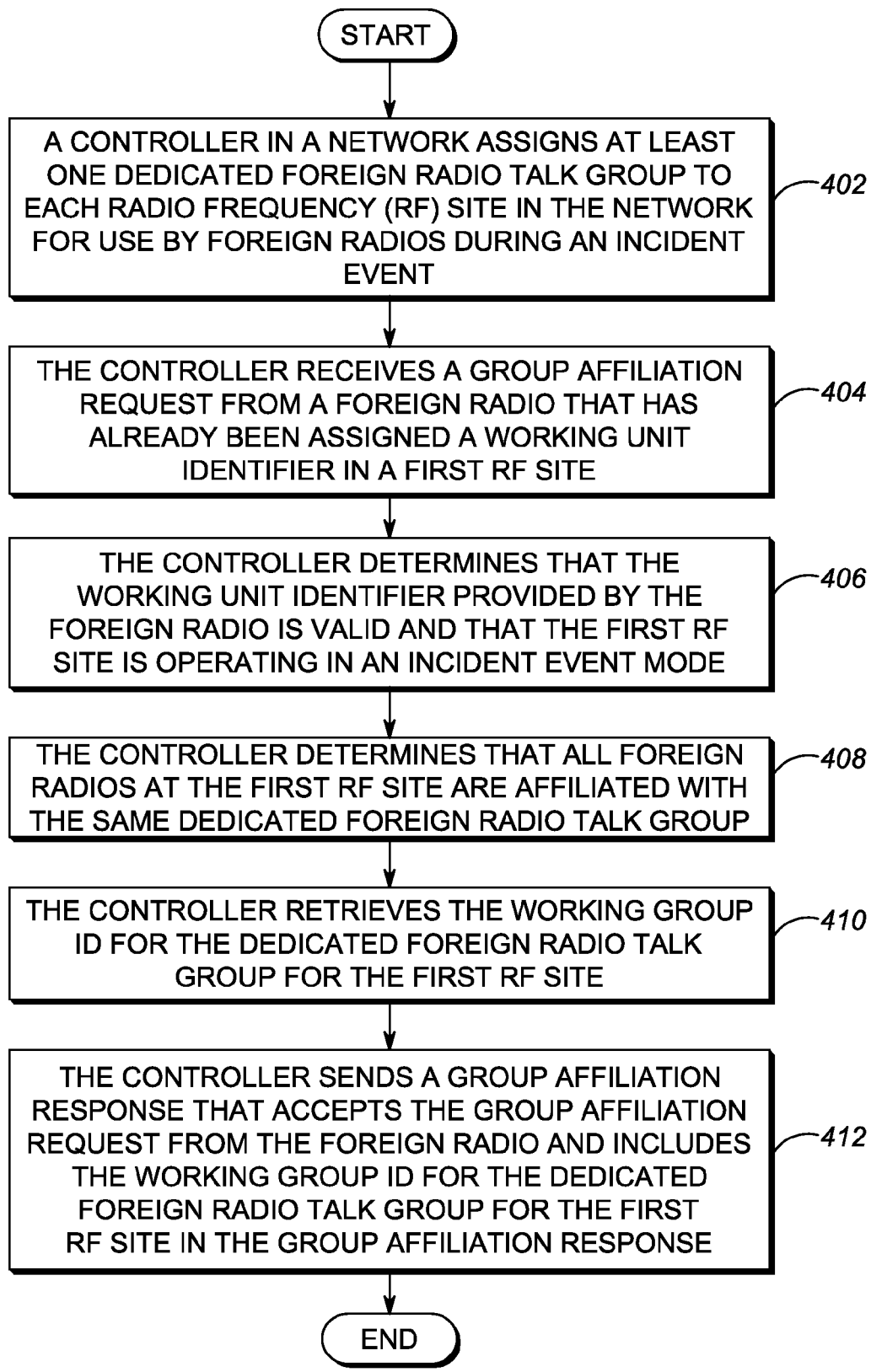

FIG. 4A is a flow diagram of how a group affiliation request from a foreign radio is processed while the controller is operating in an incident event mode in accordance with some embodiments. At 402, a controller in a network assigns at least one dedicated foreign radio talk group to each radio frequency (RF) site in the network for use by foreign radios during an incident event. At 404, the controller receives a group affiliation request from a foreign radio that has already been assigned a working unit identifier in a first RF site. At 406, the controller determines that the working unit identifier provided by the foreign radio is valid and that the first RF site is operating in an incident event mode. At 408, the controller determines that all foreign radios at the first RF site are affiliated with the same dedicated foreign radio talk group. At 410, the controller retrieves the working group ID for the dedicated foreign radio talk group for the first RF site. At 412, the controller sends a group affiliation response that accepts the group affiliation request from the foreign radio and includes the working group ID for the dedicated foreign radio talk group for the first RF site in the group affiliation response.

Figure 4B:
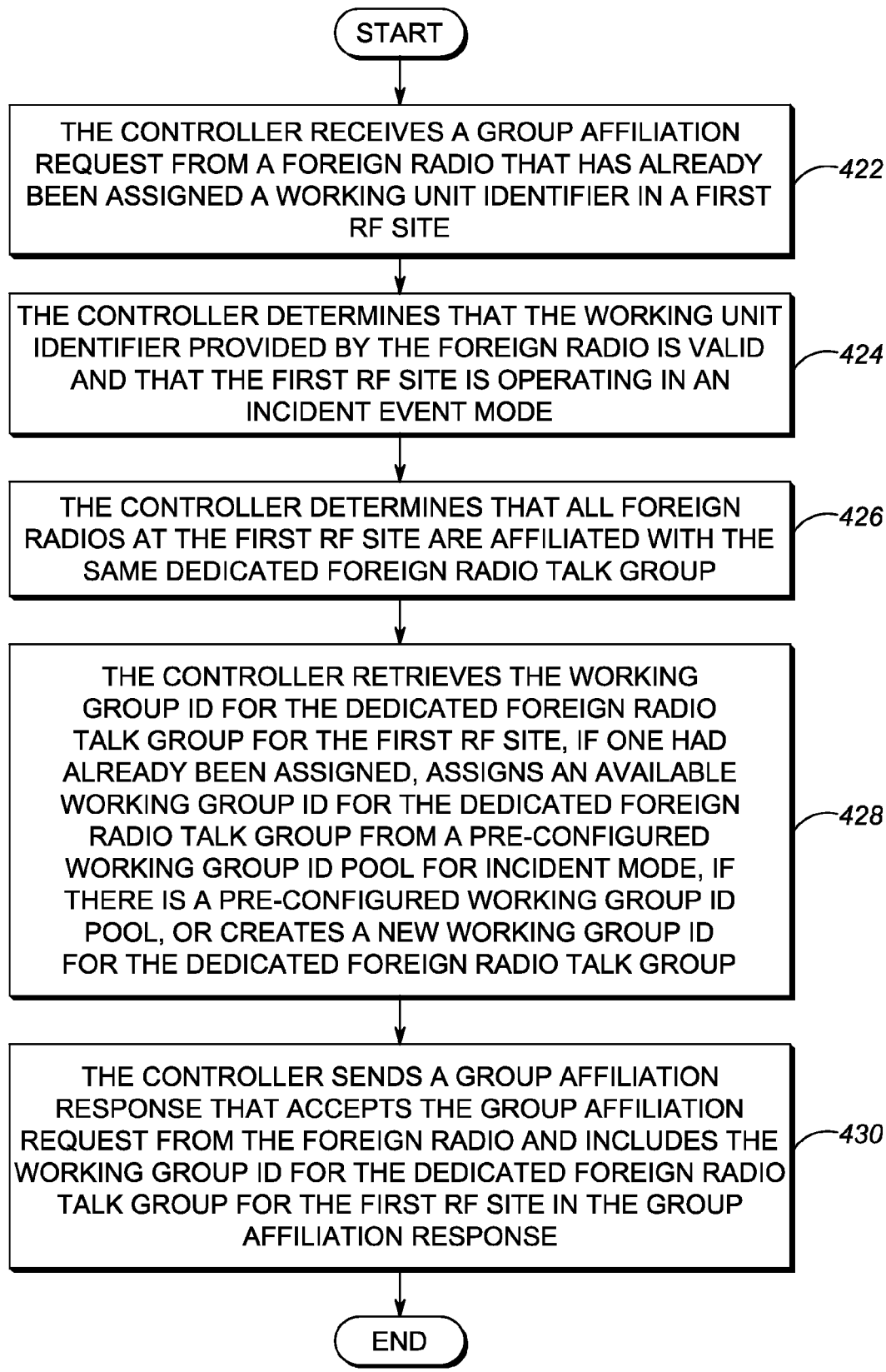

FIG. 4B is another flow diagram of how a group affiliation request from a foreign radio is processed while the controller is operating in an incident event mode in accordance with some embodiments. At 422, the controller receives a group affiliation request from a foreign radio that has already been assigned a working unit identifier in a first RF site. At 424, the controller determines that the working unit identifier provided by the foreign radio is valid and that the first RF site is operating in an incident event mode. At 426, the controller determines that all foreign radios at the first RF site are affiliated with the same dedicated foreign radio talk group. At 428, the controller retrieves the working group ID for the dedicated foreign radio talk group for the first RF site, if one had already been assigned, assigns an available working group ID for the dedicated foreign radio talk group from a pre-configured working group ID pool for incident mode, if there is a pre-configured working group ID pool, or creates a new working group ID for the dedicated foreign radio talk group. At 430, the controller sends a group affiliation response that accepts the group affiliation request from the foreign radio and includes the working group ID for the dedicated foreign radio talk group for the first RF site in the group affiliation response.

Figure 4C:
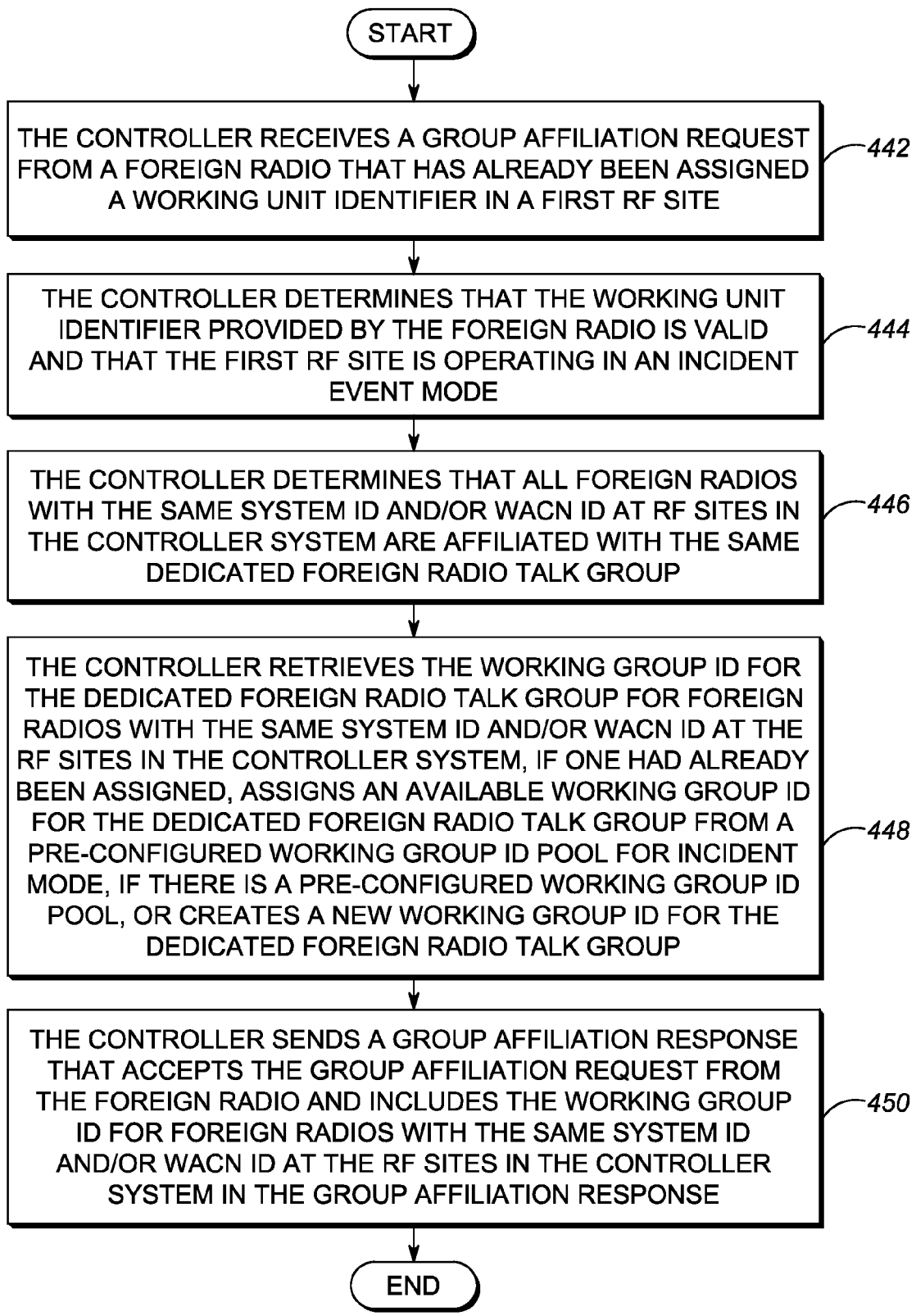

FIG. 4C is another flow diagram of how a group affiliation request from a foreign radio is processed while the controller is operating in an incident event mode in accordance with some embodiments. At 442, the controller receives a group affiliation request from a foreign radio that has already been assigned a working unit identifier in a first RF site. At 444, the controller determines that the working unit identifier provided by the foreign radio is valid and that the first RF site is operating in an incident event mode. At 446, the controller determines that all foreign radios with the same system ID and/or WACN ID at the RF sites in the controller system are affiliated with the same dedicated foreign radio talk group. At 448, the controller retrieves the working group ID for the dedicated foreign radio talk group for foreign radios with the same system ID and/or WACN ID at the RF sites in the controller system, if one had already been assigned, assigns an available working group ID for the dedicated foreign radio talk group from a pre-configured working group ID pool for incident mode, if there is a pre-configured working group ID pool, or creates a new working group ID for the dedicated foreign radio talk group. At 450, the controller sends a group affiliation response that accepts the group affiliation request from the foreign radio and includes the working group ID for foreign radios with the same system ID and/or WACN ID at the RF sites in the controller system.

Figure 4D:
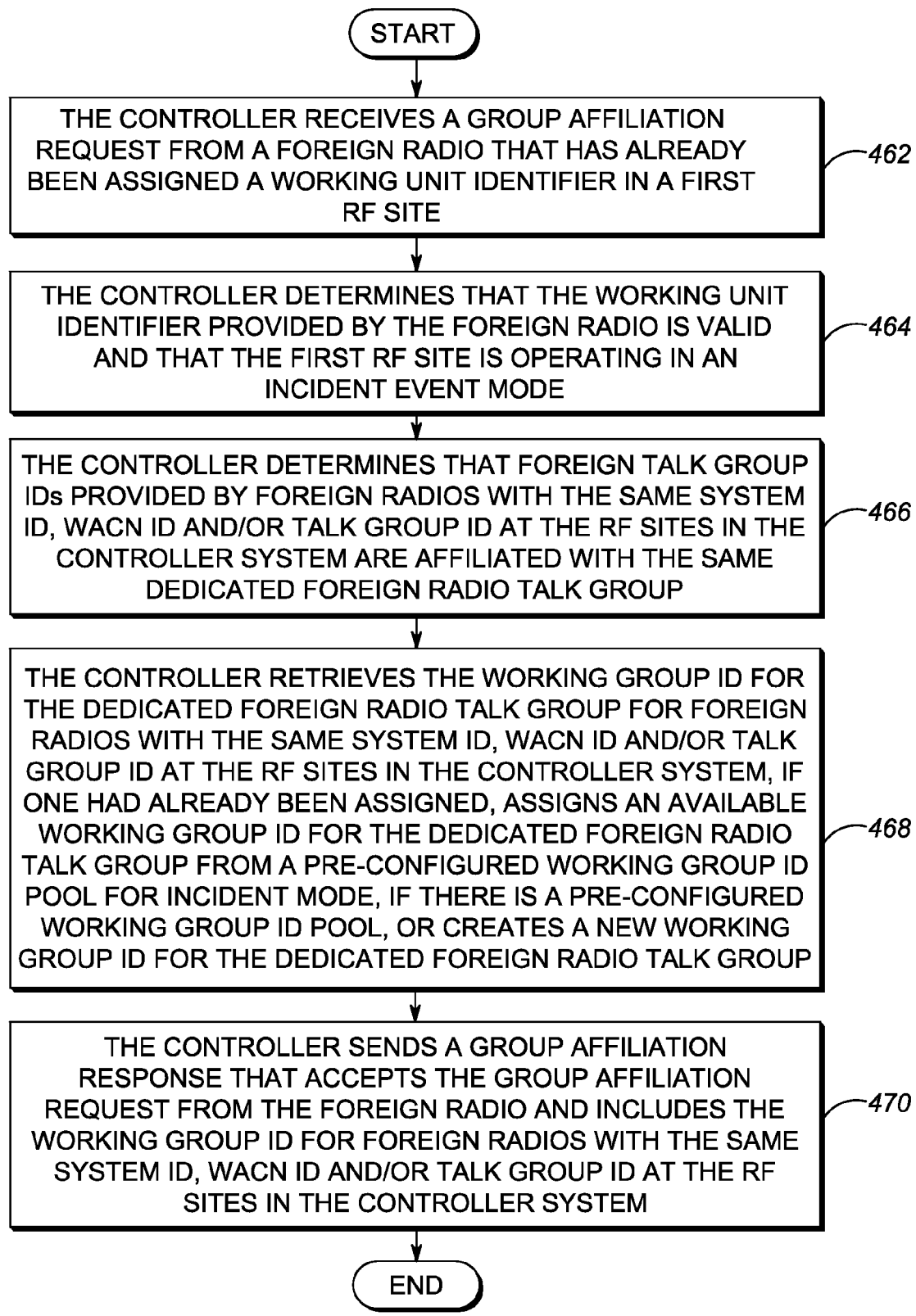

FIG. 4D is another flow diagram of how a group affiliation request from a foreign radio is processed while the controller is operating in an incident event mode in accordance with some embodiments. At 462, the controller receives a group affiliation request from a foreign radio that has already been assigned a working unit identifier in a first RF site. At 464, the controller determines that the working unit identifier provided by the foreign radio is valid and that the first RF site is operating in an incident event mode. At 466, the controller determines that foreign talk group IDs provided by foreign radios with the same system ID, WACN ID and/or talk group ID at the RF sites in the controller system are affiliated with the same dedicated foreign radio talk group. At 468, the controller retrieves the working group ID for the dedicated foreign radio talk group for foreign radios with the same system ID, WACN ID and/or talk group ID at the RF sites in the controller system, if one had already been assigned, assigns an available working group ID for the dedicated foreign radio talk group from a pre-configured working group ID pool for incident mode, if there is a pre-configured working group ID pool, or creates a new working group ID for the dedicated foreign radio talk group. At 470, the controller sends a group affiliation response that accepts the group affiliation request from the foreign radio and includes the working group ID for foreign radios with the same system ID and/or WACN ID at the RF sites in the controller system.

Figure 4E:
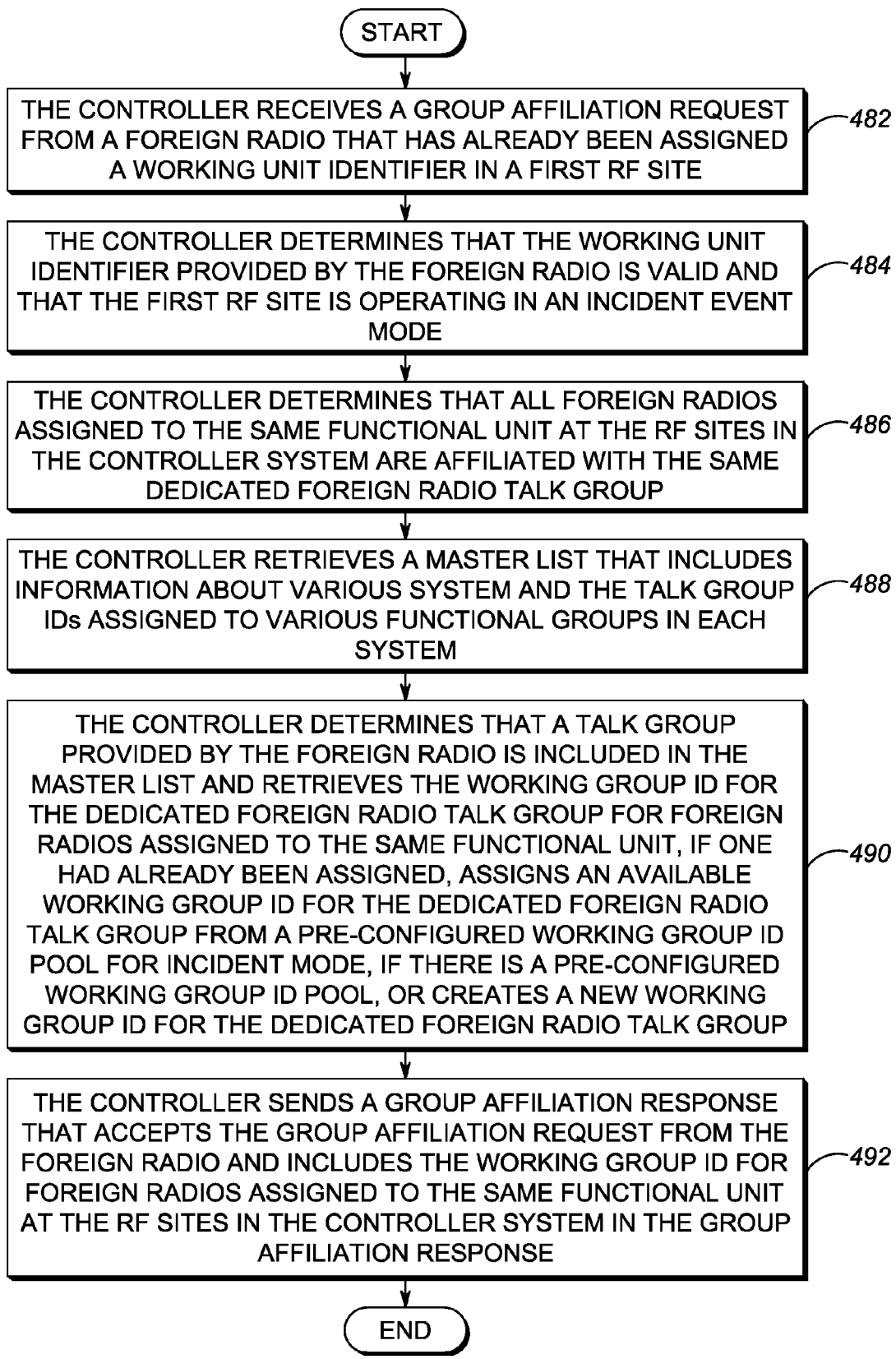

FIG. 4E is another flow diagram of how a group affiliation request from a foreign radio is processed while the controller is operating in an incident event mode in accordance with some embodiments. At 482, the controller receives a group affiliation request from a foreign radio that has already been assigned a working unit identifier in a first RF site. At 484, the controller determines that the working unit identifier provided by the foreign radio is valid and that the first RF site is operating in an incident event mode. At 486, the controller determines that all foreign radios assigned to the same functional unit at the RF sites in the controller system are affiliated with the same dedicated foreign radio talk group. At 488, the controller retrieves a master list that includes information about various systems and the talk group IDs assigned to various functional groups in each system. At 490, the controller determines that a talk group provided by the foreign radio is included in the master list and retrieves the working group ID for the dedicated foreign radio talk group for foreign radios assigned to the same functional unit, if one had already been assigned, assigns an available working group ID for the dedicated foreign radio talk group from a pre-configured working group ID pool for incident mode, if there is a pre-configured working group ID pool, or creates a new working group ID for the dedicated foreign radio talk group. At 492, the controller sends a group affiliation response that accepts the group affiliation request from the foreign radio and includes the working group ID for foreign radios assigned to the same functional unit at the RF sites in the controller system.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:
1. A method comprising:
assigning, by a controller, at least one dedicated foreign radio talk group to each radio frequency (RF) site in a network for use by foreign radios during an incident event;
receiving, by the controller, a registration request and a talk group affiliation request from a foreign radio in a first RF site;
registering the foreign radio in the first RF site;
determining, by the controller, whether the first RF site is in an incident event mode configuration;
responsive to determining that the first RF site is in the incident event mode, affiliating, by the controller, the foreign radio with the at least one dedicated foreign radio talk group that is at least one of:
assigned to the first RF site,
associated with at least one of a system identifier, a Wide Area Communication Network (WACN) identifier and a talk group identifier provided by the foreign radio, and
associated with the talk group identifier provided by the foreign radio and included in a master list including talk group IDs associated with a function.

2. The method of claim 1, wherein the assigning comprises:
pre-allocating a set of working unit IDs (WUIDs) that are assignable to register foreign radios when the incident event mode is activated at the first RF site;
pre-allocating a set of dedicated working Group IDs (WGIDs) to RF sites in the network, wherein a WGID is associated with each dedicated foreign radio talk group allocated to each RF site; and
temporarily assigning the WGID associated with a dedicated foreign radio talk group allocated to the first RF site for foreign radios affiliation when the incident event mode is activated at the first RF site.

3. The method of claim 1, wherein the registration request includes the system identifier and the WACN identifier of the foreign radio.

4. The method of claim 1, wherein the registering comprises temporarily assigning a WUID to the foreign radio.

5. The method of claim 1, wherein the affiliating comprises affiliating all foreign radios registered in the first RF site in the incident event mode with a first dedicated foreign radio talk group assigned to the first RF site.

6. The method of claim 1, wherein the affiliating comprises one of:
affiliating foreign radios registered in the first RF site based at least one of the system identifier and the WACN identifier provided by each of the foreign radios, wherein all foreign radios associated with at least one of a first system ID and a first WACN ID are affiliated with a first dedicated foreign radio talk group assigned to RF sites including the first RF site; and
affiliating foreign radios registered in the first RF site based at least one of the system identifier, the WACN identifier and a foreign talk group identifier of a foreign talk group provided by each of the foreign radios, wherein all foreign radios associated with at least one of the first system ID, the first WACN ID and a first talk group identifier are affiliated with the first dedicated foreign radio talk group assigned to the RF sites including the first RF site.

7. The method of claim 1, further comprising:
assigning a WGID associated with a dedicated foreign radio talk group to a predefined function; and
the affiliating comprises affiliating foreign radios registered in the first RF site based at least one of the system identifier, the WACN identifier and the talk group ID provided by each of the foreign radios, wherein the talk group ID is compared against information in the master list including talk group IDs, each of which is associated with a function, wherein all foreign radios providing a first talk group ID assigned to a first predefined function are affiliated with a first dedicated foreign radio talk group assigned to RF sites including the first RF site.

8. The method of claim 1, further comprising assigning, by the controller, at least one of limited capabilities and a lower priority to foreign radios.

9. The method of claim 1, wherein subsequent to the foreign radio moving to a second RF site in the incident event mode, instructing, by the controller, the foreign radio to register with the second RF site; and subsequent to registering the foreign radio with the second RF site, affiliating the foreign radio with at least one dedicated foreign radio talk group assigned to the second RF site.

10. The method of claim 1, further comprising disabling, by the controller, the incident event mode configuration and disabling repeating of talk group audio in the first RF site.

11. A controller comprising:
a memory configured to store foreign radio talk group assignments;
a transceiver; and
a processor configured to:
assign at least one dedicated foreign radio talk group to each radio frequency (RF) site in a network for use by foreign radios during an incident event;
receive, via the transceiver, a registration request and a talk group affiliation request from a foreign radio in a first RF site;
register the foreign radio in the first RF site;
determine whether the first RF site is in an incident event mode configuration;
responsive to determining that the first RF site is in the incident event mode, affiliate the foreign radio with the at least one dedicated foreign radio talk group that is at least one of:
assigned to the first RF site,
associated with at least one of a system identifier, a Wide Area Communication Network (WACN) identifier and a talk group identifier provided by the foreign radio, and
associated with the talk group identifier provided by the foreign radio and included in a master list including talk group IDs associated with a function.

12. The controller of claim 11, wherein the processor is configured to:
pre-allocate a set of working unit IDs (WUIDs) that are assignable to register foreign radios when the incident event mode is activated at the first RF site;
pre-allocate a set of dedicated working Group IDs (WGIDs) to RF sites in the network, wherein a WGID is associated with a dedicated foreign radio talk group allocated to each RF site; and
temporarily assign the WGID associated with a dedicated foreign radio talk group allocated to the first RF site for foreign radios affiliation when the incident event mode is activated at the first RF site.

13. The controller of claim 11, wherein the processor is configured to receive the system identifier and the wide area communication network identifier of the foreign radio in the registration request.

14. The controller of claim 11, wherein the processor is configured to temporarily assign a WUID to the foreign radio during the registration.

15. The controller of claim 11, wherein the processor is configured to affiliate all foreign radios registered in the first RF site in the incident event mode with a first dedicated foreign radio talk group assigned to the first RF site.

16. The controller of claim 11, wherein the processor is configured to at least one of:
affiliate foreign radios registered in the first RF site based at least one of the system identifier and the WACN identifier provided by each of the foreign radios, wherein all foreign radios associated with at least one of a first system ID and a first WACN ID are affiliated with a first dedicated foreign radio talk group assigned to RF sites including the first RF site; and
affiliate foreign radios registered in the first RF site based at least one of the system identifier, the WACN identifier and a foreign talk group identifier of a foreign talk group provided by each of the foreign radios, wherein all foreign radios associated with at least one of the first system ID, the first WACN ID and a first talk group identifier are affiliated with the first dedicated foreign radio talk group assigned to the RF sites including the first RF site.

17. The controller of claim 11, wherein the processor is configured to:
assign a WGID associated with a dedicated foreign radio talk group to a predefined function; and
affiliate foreign radios registered in the first RF site based at least one of the system identifier, the WACN identifier and the talk group ID provided by each of the foreign radios, wherein the talk group ID is compared against information in the master list including talk group IDs, each of which is associated with a function,
wherein all foreign radios providing a first talk group ID assigned to a first predefined function are affiliated with a first dedicated foreign radio talk group assigned to RF sites including the first RF site.

18. The controller of claim 11, wherein the processor is configured to assign at least one of limited capabilities and a lower priority to foreign radios.

19. The controller of claim 11, wherein subsequent to the foreign radio moving to a second RF site in the incident event mode, the processor is configured to instruct the foreign radio to register with the second RF site; and
subsequent to registering the foreign radio with the second RF site, the processor is configured to affiliate the foreign radio with at least one dedicated foreign radio talk group assigned to the second RF site.

20. The controller of claim 11, wherein the processor is configured to disable the incident event mode configuration and disable repeating of talk group audio in the first RF site.

* * * * *